United States Patent
Shaw

(10) Patent No.: US 6,728,415 B2
(45) Date of Patent: Apr. 27, 2004

(54) METHOD AND APPARATUS FOR IMAGE PROCESSING USING ADAPTIVE CONVOLUTION FILTERS

(75) Inventor: Rodney Shaw, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 09/823,695

(22) Filed: Mar. 30, 2001

(65) Prior Publication Data

US 2003/0016371 A1 Jan. 23, 2003

(51) Int. Cl.⁷ .................................................. G06T 5/00
(52) U.S. Cl. ...................................... 382/261; 382/260
(58) Field of Search ............................... 382/260–269, 382/276–281, 299–300

(56) References Cited

U.S. PATENT DOCUMENTS

| | | | |
|---|---|---|---|
| 5,327,894 A | 7/1994 | Thomas | 128/661.08 |
| 5,546,477 A | 8/1996 | Knowles et al. | 382/242 |
| 5,872,867 A | 2/1999 | Bergen | 382/254 |
| 5,880,767 A | 3/1999 | Liu | |
| 5,937,102 A | 8/1999 | Jin | 382/276 |
| 6,005,983 A | 12/1999 | Anderson et al. | 382/254 |
| 6,101,235 A | 8/2000 | Zavaljevski et al. | 378/4 |
| 6,148,117 A | * 11/2000 | Lopez et al. | 382/279 |

FOREIGN PATENT DOCUMENTS

| | | |
|---|---|---|
| EP | 0797349 A2 | 9/1997 |
| EP | 0898244 A2 | 2/1999 |

OTHER PUBLICATIONS

Rodney Shaw, Factors Influencing the Sharpness of Digital Prints, IS&T Proceedings of NIP 15: International Conference on Digital Printing Technologies pp. 446–449, Oct. 1999.
Torsten Moller, Spatial Domain Filter Design, invited paper, submitted to IEEE Transaction on Visualization and Computer Graphics (currently in review).
Signals and frequencies at www–psych.stir.ac.uk/documents/V/signal/signal.html.
Enhanced image filtering at www.intergalact.com/sl9/filt.html.
Filtering and Convolution at www–psych.stir.ac.uk/documents/V/filtering/filtering.cgi.
Douglas George, Image–Processing Basics: Spatial Filtering at www.skypub.com/imaging/ccd/filtering.html.
Spatial Filtering at offices.geog.uvic.ca/geog322/htmls/spatial_filter.htmi.
Convolution Filtering Instructions at www.geog.nottingham.ac.uk/dee/rs/rsexe/convolve/conv.html.
A.M. Darwish, et al.; "Adaptive Resampling Algorithm for Image Zooming;" IEE Proceedings: Vision, Image and Signal Processing, Institution of Electrical Engineers; vol. 144, No. 4; Aug. 22, 1997; pp. 207–212.
Frank Neycenssac; "Contrast Enhancement Using the Laplacian–of–a–Gaussian Filter;" CVGIP Graphical Models and Image Processing, Academic Press, Deluth, MA, US; vol. 55, No. 6; Nov. 1, 1993; pp. 447–463.

* cited by examiner

Primary Examiner—Thomas D. Lee
Assistant Examiner—Stephen Brinich

(57) ABSTRACT

A method of spatially filtering an image using an adaptive convolution filter is disclosed. The adaptive convolution filter has two major properties. First, size of the convolution filter adapts to the resolution density of the image being filtered. Second, values of the filter dynamically vary depending on an adaptive value that, in turn, depends on the output resolution.

26 Claims, 1 Drawing Sheet

METHOD AND APPARATUS FOR IMAGE PROCESSING USING ADAPTIVE CONVOLUTION FILTERS

BACKGROUND

The present invention relates to the art of processing digital images. More particularly, the present invention relates to the art of image filtering techniques for visual enhancement of digital prints and photographs.

Many techniques exist for processing and filtering signals, especially signals representing two-dimensional (2D) images. As the 2D images are increasingly digitized and computerized, it becomes easier to apply many more different filtering techniques than before. Digitized images are typically represented by an array (typically but not necessarily rectangular) of pixels, each pixel represented by a digital value and representing a smallest unit of the digital image.

Spatial filtering is the filtering of an image in the spatial domain. That is, the value of each pixel of the image is modified in contextual relationship to neighboring pixels. Typically, spatial filtering is used to remove noise, to enhance the image, to manipulate the image into some more visually attractive form, or any combination of these. For example, a low pass filter, applied to an image, smoothes the image by removing finer details such as noise but will also blur image detail.

On the other hand, a high pass filter removes low spatial frequencies while retaining ("passing") high frequency information. This tends to highlight edges and other sharp boundaries. Because of human visual perception consideration, an image having enhanced high frequency components appears sharper than an image without enhanced high frequency components. The following is a typical high pass filter in a 3×3 (conservative) kernel:

| -1 | -1 | -1 |
|----|----|----|
| -1 | 9  | -1 |
| -1 | -1 | -1 |

Filters are not limited to 3×3 in size, and the values of each component of the kernel may be different to achieve different filtering effects. However, because such filters are rectangular in configuration, they tend to amplify the grid-nature, or digital-ness, of the image they are filtering.

Further, filters of this nature are not necessarily matched in either scale (or strength) or spatial extent to the natural visual scale that is optimum for viewing the digital form of the image.

Consequently, there is a need for a technique and apparatus for filtering images overcoming these shortcomings of the current art and matching the digital image in scale and extent to the optimum visual characteristics as viewed.

SUMMARY

The need is met by the present invention. According to one aspect of the present invention, a method of processing an image includes spatially filtering the image using an adaptive convolution filter.

According to another aspect of the invention, an apparatus for processing an image includes a processor and storage connected to the processor. The storage includes instructions for the processor to filter the image using an adaptive convolution filter.

Other aspects and advantages of the present invention will become apparent from the following detailed description, taken in combination with the accompanying drawings, illustrating by way of example the principles of the invention.

DETAILED DESCRIPTION

Figure 1:
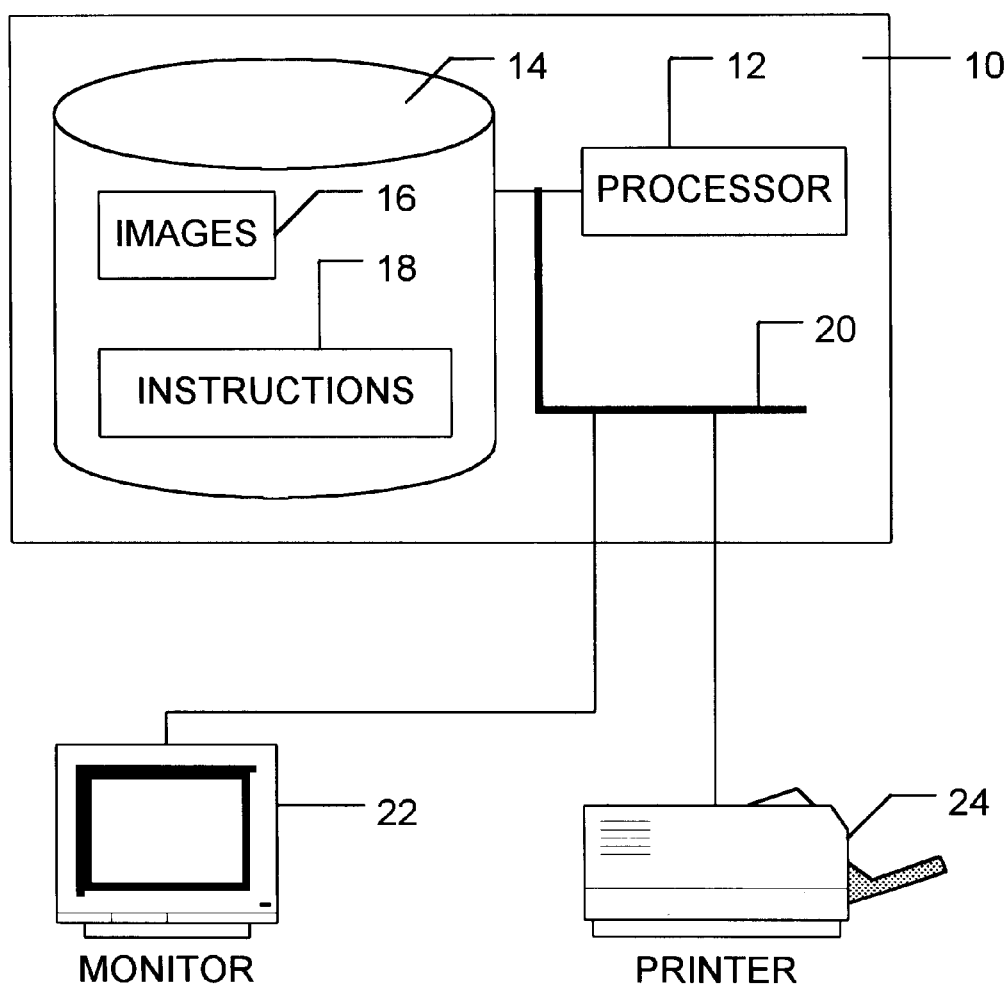
FIG. 1 is a simplified diagram of a computing apparatus used to implement one embodiment of the present invention.

As shown in the drawings for purposes of illustration, the present invention is embodied in a method of processing an image by spatially filtering the image using an adaptive and circular-symmetric-approximating convolution filter. Because the convolution filter is adaptive to the underlying spatial resolution (in dots per inch, or dpi) of the image, output resolution density (also in dpi), or both, the degree of filtering can be controlled for maximal enhancement according to the needs of teach individual image. In this document, for convenience, phrase "circular filter" or "circular convolution filter" are used in place of and with the same meaning as "circular-symmetric-approximating filter."

Convolution Filter Adaptive to Output Interval

TABLE 1 below illustrates one embodiment of the adaptive convolution filter, which is shown as a five-by-five (5×5) filter.

TABLE 1

| 0   | 0    | -2A  | 0    | 0   |
|-----|------|------|------|-----|
| 0   | -9A  | -14A | -9A  | 0   |
| -2A | -14A | C    | -14A | -2A |
| 0   | -9A  | -14A | -9A  | 0   |
| 0   | 0    | -2A  | 0    | 0   | where C is 101 plus an adaptive value (designated herein as X for brevity) and A is (C−1)/100.

Note that in this example, this convolution filter is conservative (sums to 1) for any value of X. The image-specific value X may be any positive value, and may depend upon the density ("output density" or "output interval") at which the image is to be printed or displayed at an output device, in addition to the sharpening need of the image under application of the filter. For example, for printing at 300 dpi, the adaptive value may typically range from ten to 40 or higher. TABLE 2 below illustrates adaptive values typically usable for image sharpening.

TABLE 2

| Resolution Density (dpi) | Adaptive X-value Range | | |
|---|---|---|---|
| | Moderate | Strong | Aggressive |
| 300 | 40  | 20  | 10 |
| 200 | 80  | 40  | 20 |
| 150 | 160 | 80  | 40 |
| 75  | 320 | 160 | 80 |
| Any | 10  | 5   | −1 |

For instance, if the image is to be printed at 150 dpi, then, using the adaptive value of 160 for moderate filtering effect, TABLE 3A below illustrates the filter of TABLE 1 with the adaptive value 160.

TABLE 3A

| 0 | 0 | −2*(C/100) | 0 | 0 |
|---|---|---|---|---|
| 0 | 0 | −9*(C/100) | 0 | 0 |
| 0 | −9*(C/100) | −14*(C/100) | −9*(C/100) | 0 |
| −9*(C/100) | −14*(C/100) | 101 + 160 | −14*(C/100) | −9*(C/100) |
| 0 | −9*(C/100) | −14*(C/100) | −9*(C/100) | 0 |
| 0 | 0 | −2*(C/100) | 0 | 0 |

Where C=101+160 and A=C/100 resulting in values in TABLE 3B below:

TABLE 3B

| 0 | 0 | −5.2 | 0 | 0 |
|---|---|---|---|---|
| 0 | −23.4 | −36.4 | −23.4 | 0 |
| −5.2 | −36.4 | 261 | −36.4 | −5.2 |
| 0 | −23.4 | −36.4 | −23.4 | 0 |
| 0 | 0 | −5.2 | 0 | 0 |

In one embodiment, the values of the adaptive convolution filter sum to one. However, this is not required to practice the present invention, and values that do not sum to one may be used for special purposes, such as an accompanying general lightening or darkening of the image. For instance, for a 5×5 filter similar to the filter illustrated by TABLE 1 having C=100+X instead of C=101+X may be used. In this case, the values of the filter sum to a zero. Such filters may be used for diagnosis of the underlying image structure by effectively contouring the image.

Convolution Filter Adaptive to Resolution Density

The adaptive convolution filter is adaptive in another aspect. That is, the size and the values of the convolution filter are adaptable to the underlying spatial resolution ("resolution interval") of the image. This is independent of the output interval. The resolution interval is that at which the image is to be printed or viewed.

For example, the filter illustrated by TABLES 1 or 3B above may be used for a 300 dpi image. For another, a second, image having resolution density of 600 dpi, a seven-by-seven (7×7) filter may be used. TABLE 4 illustrates a 7×7 filter that may be used to process a 600 dpi image.

TABLE 4

| 0 | 0 | 0 | −15A | 0 | 0 | 0 |
|---|---|---|---|---|---|---|
| 0 | −15A | −50A | −70A | −50A | −15A | 0 |
| 0 | −50A | 0 | (100 + X)A | 0 | −50A | 0 |
| −15A | −70A | (100 + X)A | 401 + 4X | (100 + X)A | −70A | −15A |
| 0 | −50A | 0 | (100 + X)A | 0 | −50A | 0 |
| 0 | −15A | −50A | −70A | −50A | −15A | 0 |
| 0 | 0 | 0 | −15A | 0 | 0 | 0 | where X is the adaptive value, C=401+4X, and A (C−1)/400. Note that, in this example, the filter is conservative for any value of x To filter images having even higher resolution interval, even larger adaptive convolution filters may be used. For instance, for 1200 dip images, a nine-by-nine adaptive filter or an even larger filter may be used.

Alternatively, the resolution interval of an image may be changed (reduced or increased) for the application of the adaptive convolution filter. For instance, a 1200 dpi image may be changed to a 300 dpi image for application of the 5×5 filter of TABLE 1. On the other hand, a 150 dpi image may be changed to a 300 dpi image for application of the 5×5 filter of TABLE 1. Standard extrapolation and interpolation techniques for changing the resolution interval of digitized images are known in the art.

Computer Implementing Adaptive Convolution Filter

Referring to FIG. 1, a computing apparatus 10 implementing one embodiment of the present invention is illustrated. The apparatus 10 includes a processor 12, for example a central processing unit connected to storage 14. The storage 14 includes image files 16, instructions 18 for the processor 12, or both. The instructions 18 include instructions for the processor 12 to filtering the image 14 using an adaptive convolution filter described herein above including, but not limited to, all aspects of the filtering technique and the properties of the filters.

The processor 12 and the storage 14 may be connected to each other via a system bus 20. Output devices such as a monitor 22, a printer 24, or both may be connected to the system 10 via the system bus 20. Capabilities of these output devices 22 and 24 determine display density of the images 14 filtered by the processor 12.

From the foregoing, it will be appreciated that the present invention is novel and offers advantages over the current art. Although a specific embodiment of the invention is described and illustrated above, the invention is not to be limited to the specific forms or arrangements of parts so described and illustrated. For example, other sizes of the adaptive convolution filters may be used to achieve similar results. The invention is limited by the claims that follow.

What is claimed is:

1. A method comprising spatially filtering an image using an adaptive convolution filter, wherein the filter is adaptive to at least one of the input resolution interval of the image and an output resolution interval, said filter being a circular convolution filter.

2. The method of claim 1 wherein at least one of a size and a value of the filter varies in accordance with the input resolution interval.

3. The method of claim 2 wherein the value of the filter varies in accordance with the output resolution interval.

4. The method of claim 1 wherein the value of the filter varies in accordance with the output resolution interval.

5. The method of claim 1 wherein the filter is a five-by-five filter having the value

| 0 | 0 | −2A | 0 | 0 |
|---|---|---|---|---|
| 0 | −9A | −14A | −9A | 0 |
| −2A | −14A | C | −14A | −2A |
| 0 | −9A | −14A | −9A | 0 |
| 0 | 0 | −2A | 0 | 0 | where C is a constant plus an adaptive value (X) and A is (C−1)/100.

6. The method of claim 5 wherein C=101+X.

7. The method of claim 5 wherein C=100+X.

8. The method of claim 5 wherein $1 \leq X \leq 320$.

9. The method of claim 1 wherein the filter is a seven-by-seven circular convolution filter having the value

| 0 | 0 | 0 | −15A | 0 | 0 | 0 |
|---|---|---|---|---|---|---|
| 0 | −15A | −50A | −70A | −50A | −15A | 0 |
| 0 | −50A | 0 | (100 + X)A | 0 | −50A | 0 |
| −15A | −70A | (100 + X)A | C | (100 + X)A | −70A | −15A |
| 0 | −50A | 0 | (100 + X)A | 0 | −50A | 0 |
| 0 | −15A | −50A | −70A | −50A | −15A | 0 |
| 0 | 0 | 0 | −15A | 0 | 0 | 0 | where C=401+4X, wherein X is an adaptive value, wherein A=(C−1)/400.

10. The method of claim 1 further comprising the step of extrapolating the image to change from an original resolution interval to the input resolution interval, wherein the original resolution interval is distinct from the input resolution interval.

11. The method of claim 1 further comprising the step of interpolating the image to change from an original resolution interval to the input resolution interval, wherein the original resolution interval is distinct from the input resolution interval.

12. A storage medium apparatus storing processor executable instructions for processing an image, wherein the instructions instruct a processor to spatially filter the image using an adaptive convolution filter, wherein the filter is adaptive to at least one of an input resolution interval of the image and an output resolution interval and wherein the filter is a circular convolution filter.

13. The apparatus of claim 12 wherein at least one of a size and a value of the filter varies in accordance with the input resolution interval.

14. The method of claim 13 wherein the value of the filter varies in accordance with the output resolution interval.

15. The method of claim 12 wherein the value of the filter varies in accordance with the output resolution interval.

16. A computing apparatus for processing an image, the apparatus comprising:

a computer housing;

a processor internal to the computer housing; and storage coupled to the processor and internal to the computer housing, the storage including instructions that are specific to enabling the processor to determine coefficients for an adaptive convolution filter in a manner independent of coefficient convolution via external devices connected to the computing apparatus, wherein the processor executes the instructions to spatially filter the image using the coefficients determined for the filter, wherein the determinations of the coefficients for the filter are adaptive to at least one of an input resolution interval of the image and an output resolution interval.

17. The apparatus of claim 16 wherein at least one of a size and a value of the filter is adaptive to the input resolution interval.

18. The apparatus of claim 16 wherein the filter is adaptive to the output resolution interval.

19. The apparatus of claim 16 wherein at least one of a size and a value of the filter varies in accordance with at least one of the input and output resolution intervals.

20. The apparatus of claim 16 wherein the filter is a circular convolution filter.

21. The apparatus of claim 16 wherein the filter is adaptive to both the input and output resolution intervals.

22. A method comprising:

extrapolating an image to change from an original resolution interval to an input resolution interval distinct from the original resolution interval; and spatially filtering the image using an adaptive convolution filter, wherein the filter has variable coefficients that are adaptive to at least one of the input resolution interval and the output resolution interval.

23. The method of claim 22 further comprising the step of selecting the input resolution interval on a basis of applying the adaptive convolution filter having the variable coefficients.

24. A method comprising:

interpolating an image to change from en original resolution interval to an input resolution interval distinct from the original resolution interval; and spatially filtering the image using an adaptive convolution filter, wherein the filter has variable coefficients that are adaptive to at least one of the input resolution interval and the output resolution interval.

25. The method of claim 24 further comprising the step of selecting the input resolution interval on a basis of applying the adaptive convolution filter having the variable coefficients.

26. A method comprising:

selecting an adaptive convolution filter for spatially filtering an image of interest, the adaptive convolution filter being configured such that a determination and an application of a single adaptive value to the filter set a matrix of coefficients for the filter;

identifying a resolution specific to the spatial filtering of the image of interest;

utilizing the identified resolution as a basis for selecting said single adaptive value;

applying said selected single adaptive value to said filter, thereby setting said coefficients; and spatially filtering said image of interest using said filter.

* * * * *